UNITED STATES PATENT OFFICE.

CHARLES N. MERIWETHER, OF TRENTON, KENTUCKY.

METHOD OF TREATING PHOSPHATE ROCK.

1,002,297.  Specification of Letters Patent.  Patented Sept. 5, 1911.

No Drawing.  Application filed November 14, 1910. Serial No. 592,239.

*To all whom it may concern:*

Be it known that I, CHARLES N. MERIWETHER, a citizen of the United States, residing at Trenton, in the county of Todd and State of Kentucky, have invented certain new and useful Improvements in Methods of Treating Phosphate Rock; and I do declare the following to be a full, clear, and exact description of the invention, such as will enable others skilled in the art to which it appertains to make and use the same.

This invention relates to a method of treating tribasic phosphate of lime to render the phosphoric acid therein soluble and available.

The object of the invention is to change the natural or neutral condition of natural mineral deposits to render the phosphoric acid contained therein available for plant fertilization without the use of sulfuric acid, which latter is commonly employed for this purpose but is expensive and also injurious to the plants.

The accepted test employed by agricultural chemists to ascertain the availability of the phosphoric acid is to subject a sample of the prepared fertilizer to a two per cent. citric acid solution, which will dissolve a large part of the phosphate in said sample if the fertilizer is in proper condition to be used for a plant food.

This invention resides in the discovery of the fact that freshly formed basic oxid of iron, that is, nascent basic oxid of iron, will absorb phosphoric acid from the tribasic compound and render it tetrabasic and soluble in the two per cent. citric acid solution. This transformation will take place slowly at ordinary temperatures but will be greatly facilitated by subjecting the compound to heat below the fusing point and agitating it while heated. It is important that the temperature be kept at a point below fusing, as otherwise the silica which is usually found in the rock will take the lime from the phosphoric acid and reduce it again to an insoluble state, the resulting mass being in the form of a very hard vitreous slag.

I have discovered a simple and efficient method of producing the basic nascent oxid of iron in the presence of the tribasic calcium phosphate and at the same time avoid the silica acting on the lime. This method differs somewhat according to the nature of the rock to be treated, for instance, if the rock contains fluorid it is particularly apt to melt and vitrify with the lime and silica.

In treating phosphate rock containing 65 per cent. tribasic phosphate of lime and 35 per cent. silica, I add to one hundred pounds of the rock from twenty-five to thirty pounds of common brown iron ore, both of which are ground fine and intimately mixed. The ground and mixed rock and ore are placed in a furnace and heated to a red heat for from one to six hours, depending on the nature of the ore and of the rock being treated. During this heating process the neutral iron oxid loses part of its oxygen and becomes a basic oxid having a great attraction for phosphoric acid which it absorbs from the lime changing it from a tricalcic to a tetracalcic phosphate. It is important that the phosphate rock and iron ore be finely pulverized and intimately mixed, as there is no fusion chemical action can only take place between surfaces in actual contact, and the finer the material is pulverized and more intimately it is mixed the more surfaces are in actual contact and the quicker will be the chemical action and the less heat will be required to liberate the phosphoric acid. If the temperature is raised too high for instance, to a bright yellow or white heat, a reaction sets in between the silica and the lime of the tetracalcic phosphate injuring the solubility of the resulting fertilizer. Should the fusing point be reached the iron ore will be reduced to metallic iron and the phosphoric acid which it has taken from the tribasic phosphate of lime will be reduced to phosphorus and a part of it escapes as gas together with the gases of combustion and is lost, and part unites with the reduced iron and is thereby injured as a fertilizer. This may be partially prevented by adding lime or magnesia to the compound as the silica will attack the free alkalis rather than the phosphate salt.

In many cases it has been found advantageous to substitute metallic iron or partially reduced ore for the natural ore, especially so when the phosphate rock is found to contain a large per cent. of iron. The turnings and filings from machine shops may be used to supply the metallic iron. Metallic iron may be used alone and will become converted into a basic oxid at a low red heat and when so converted will accomplish the change in the phosphate rock to render the phosphoric acid therein soluble.

The agitation of the compound while being heated is advantageous in that it brings new surfaces of the particles of iron oxid and phosphate rock into contact thereby permitting the chemical action and it also keeps the material in a pulverized condition, thereby rendering it unnecessary to regrind the resulting product.

Other metals may be used instead of iron or in connection with it. To do this I produce the basic oxid of iron beforehand and grind it and the phosphate rock together with the other salts. The violent breaking apart and the bringing together of freshly broken surfaces contributes to chemical reaction. Salts of barium, potassium sodium, ammonium, and magnesium may be used. Or the ferro-cyanid of potassium, which will at once form a complete fertilizer.

Various changes in the proportion and minor details may be resorted to without departing from the principles or advantages of the invention as defined in the appended claims.

I claim as my invention:

1. A process of treating phosphate rock to render the phosphoric acid contained therein available, which comprises pulverizing the rock and combining it with pulverized basic oxid of iron.

2. A process of treating phosphate rock to render the phosphoric acid contained therein available, which comprises pulverizing the rock and combining it with pulverized basic oxid of iron and heating the compound to a temperature below fusing.

3. A process of treating phosphate rock to render the phosphoric acid contained therein soluble, which comprises pulverizing the rock and combining it with pulverized iron ore at a temperature below fusing point.

4. A method of rendering the phosphoric acid in phosphate rock available, which comprises pulverizing the rock and mixing it with a mixture of pulverized iron ore and iron and then heating the compound to a temperature below fusing.

5. A method of rendering the phosphoric acid in phosphate rock available, which comprises pulverizing the rock and mixing it with a mixture of pulverized iron ore and iron and then heating the compound to a temperature below fusing and thoroughly agitating said compound during the heating process.

6. A method of rendering phosphoric acid in phosphate rock available, which consists in mixing phosphate rock with oxid of iron and iron and a salt of potassium and grinding them so as to break up the particles and bring fresh surfaces together thereby producing a transfer of part of the phosphoric acid from the phosphate rock to the other bases without fusing.

In testimony whereof I have hereunto set my hand in presence of two subscribing witnesses.

CHARLES N. MERIWETHER.

Witnesses:
E. H. DICKINSON,
E. R. THOMPSON.